United States Patent [19]

Moutet et al.

[11] 4,223,350
[45] Sep. 16, 1980

[54] DIASCOPE FOR A TELEVISION CAMERA

[75] Inventors: Louis Moutet; Jean-Marc Moenne-Loccoz, both of Paris, France

[73] Assignee: Thomson-CSF, Paris, France

[21] Appl. No.: 27,276

[22] Filed: Apr. 5, 1979

[30] Foreign Application Priority Data

Apr. 11, 1978 [FR] France ............................. 78 10612

[51] Int. Cl.[2] ............................................. H04N 7/02
[52] U.S. Cl. ..................................... 358/139; 358/10
[58] Field of Search ...................... 358/139, 225, 10, 55

[56] References Cited

U.S. PATENT DOCUMENTS 4,134,129  1/1979  Filipovich ............................. 358/55

FOREIGN PATENT DOCUMENTS 799767  8/1958  United Kingdom ..................... 358/139

*Primary Examiner*—Richard Murray
*Attorney, Agent, or Firm*—Roland Plottel

[57] ABSTRACT

A diascope for a television camera comprises a support, a slide holder and an objective lens. In the support is provided a longitudinal slot with a V-shaped cross-section; the slide holder and the objective lens are placed in the slot and are maintained therein by means of leaf springs attached to the support. The slide holder has a cylindrical shape; the angular position of a test pattern integral with the slide holder is adjusted by rotation of the latter about its longitudinal axis. The longitudinal position of the objective lens is adjusted by causing the objective lens to slide towards one end or the other of the slot. The diascope also comprises a deflecting prism, integral with connecting means whose distance in relation to the support of the diascope can be adjusted by three screws which pass through the connecting means into which they are screwed and whose points come into contact with the support; leaf springs, integral with the support at one of their ends, bear against the connecting means in such a way as to maintain the contact between the points of the screws and the support.

5 Claims, 2 Drawing Figures

DIASCOPE FOR A TELEVISION CAMERA

The present invention relates to a diascope for a television camera, comprising a light source and a support on which are fixed a slide holder, an objective lens and means for deflecting the light rays from the source.

Such diascopes are known wherein the support is, for example, constituted by the filter mounting of the television camera. In diascope position, the filter mounting brings the assembly constituted by the slide holder with its test pattern, the objective lens or lenses and the deflecting means into a position such that the light source, which is generally fixed and external to the filter mounting, sends a beam that illuminates the test pattern and passes through the objective lens of the diascope; the beam is then deflected by the deflecting means in such a way as to follow the same path as that followed by the light from the lens of the camera during a shooting.

The supports of these types of diascope are generally thin (a few millimeters). Now, the space available behind the lens of the camera makes it necessary for the parts mounted on the support to be arranged in spaces provided inside the support. These parts are thus small in size and it is known to cement them to the support; however, this method of mounting has various drawbacks; it is awkward to effect as the position of each of the parts has to be precisely adjusted before cementing and, if the adjustment has to be repeated, it is necessary to detach the part beforehand.

The object of the invention is a diascope that does not entail the above-mentioned drawbacks while, at the same time, not proving more costly or less functionally reliable than known diascopes.

According to the invention, there is provided a diascope for a television camera designed in such a way as to enable optical adjustments and comprising for this purpose:

a support in which is provided a rectilinear slot having a cross-section which flares from the bottom to the top, a slide holder, an objective lens and deflecting means for deflecting light rays, first and second pressure-applying means integral with said support, for pressing said slide holder and said objective lens respectively into said rectilinear slot, connecting means for connecting said deflecting means and said support comprising: fixing means integral with said deflecting means; three adjustable spacing means for adjustably spacing said fixing means from said support; and third pressure-applying means, integral with said support, for pressing said deflecting means into contact with said support.

The present invention will be more readily understood and other features will become apparent from the following description and the corresponding drawings, wherein:

FIG. 1 is a partial, schematic view of a colour television picture pickup camera comprising a diascope according to the invention.

FIG. 1 shows:

Figure 1:
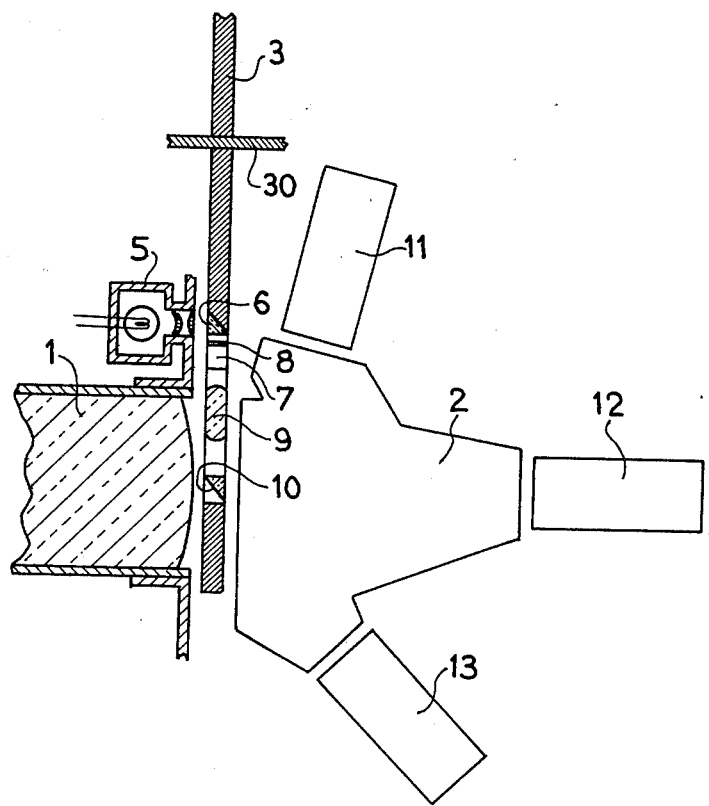
FIG. 1 is a schematic partial view of a television camera comprising a diascope according to the invention.

a camera lens 1 for picture pickup, this camera lens is represented in a partial, cross-sectional view, a light source, 5, comprising a lamp and a light condenser, a supporting disc 3, with its axis of rotation 30; this supporting disc serves, in the example described, both to support the filters of the camera and the diascope, an optical assembly comprising: a prism 6 designed to deflect the light from the source 5 when, as shown in FIG. 1, the disc 3 places the prism 6 in front of the source; a slide holder, 7, with its test pattern, 8; an objective lens 9; and a prism 10 designed to deflect the light from the source 2 in the direction of a trichromatic separator, 2, after it has passed through the prism 6, the slide holder 7 and the objective lens 9, the trichromatic separator 2, three camera tubes 11, 12 and 13.

For guidance, the supporting disc described in a disc with a diameter of 130 mm and a thickness of 4 mm, made of an aluminium alloy.

Figure 2:
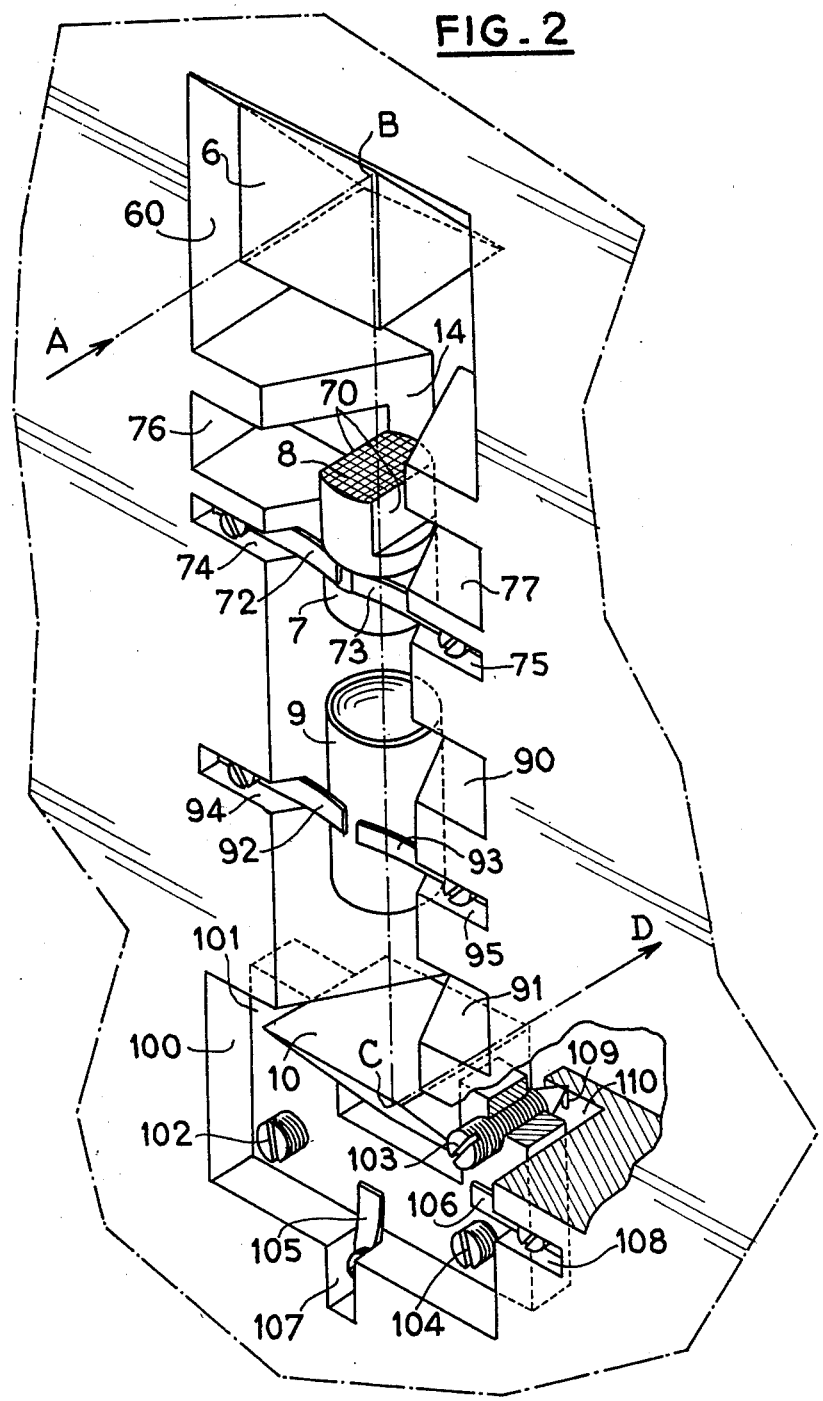
FIG. 2 is a detail of part of the diascope of FIG. 1.

FIG. 2 is a detailed view showing a part of the supporting disc 3 and the elements 6 to 10 of the diascope.

This view shows a light ray ABCD from source 5 (FIG. 1) travelling in the direction of the trichromatic separator 2 (FIG. 1).

The prism 6 is placed in an opening, 60, passing through the supporting disc 3. The light ray ABCD is horizontal when it penetrates one vertical face of the prism 6; it is reflected in the prism on an oblique face (point B) by which the prism 6 is cemented to a wall of opening 60; the light ray then emerges vertically from the prism 6, through a horizontal face of the latter.

The light ray ABCD then passes through the slide holder 7 with its test pattern 8. The slide holder has a cylindrical shape; this cylinder bears on the inclined walls of a V-shaped rectilinear slot, 14, cut out in disc 3. Two leaf springs, 72, 73, attached by one of their ends in notches, 74, 75, in the edges of the slot 14, apply a pressure to the slide holder 7 that maintains the latter in the slot. To prevent the slide holder from longitudinal displacement in the slot, the slide holder has a cylindrical groove 71; thus, the leaf springs 72, 73 whose free ends are engaged in this groove, serve as longitudinal stops for the slide holder. The slide holder has two parallel facets, 70 to enable the test pattern 8 to be angularly orientated by means of a spanner, not represented, whose gauge is slightly greater than the distance between the two facets; two recesses, 76, 77, are provided on the sides of the V-shaped slot to allow the spanner sufficient angular clearance. It should be noted that the position of the test pattern 8 cannot be adjusted, through lack of space, when the camera lens is in place and that the camera lens 1 has to be removed to allow easy access to the facets 70 of the slide holder 7. It should also be noted that there is no disadvantage in removing the camera lens 1 since, when the diascope is in its operating position, the camera lens is not used.

After passing through the slide holder 7, the ray ABCD encounters the objective lens 9. The objective lens 9 is cylindrical in shape; this cylinder bears on the walls of slot 14. Two leaf springs 92, 93, attached by one of their ends in notches 94, 95, provided in the edge of slot 14, apply a pressure to the objective lens 9 that maintains the latter in the slot. Two recesses, 90, 91, are provided in one of the edges of slot 14 to enable the objective lens to be displaced, using an implement, not represented (for example the blade of a screwdriver), in the direction of one or the other of the ends of the slot in order to enable focussing of the image of test pattern 8 on the camera tubes, 11, 12, 13, shown in FIG. 1; for this purpose, the implement is used as a lever whose two bearing points are the edge of one of the ends of the objective lens and the wall of one of the recesses, 90,91. As when adjusting the slide holder, it is necessary, in order to adjust the objective lens 9, to remove the camera lens 1 temporarily.

After leaving the objective lens 9, the ray ABCD enters prism 10 through a horizontal face of the latter; it is reflected in the prism by an oblique face (point C); the light ray then emerges horizontally from prism 10 by a vertical face of the latter.

The prism 10 is placed in an opening, 100, which passes through the supporting disc 3; it is maintained in this opening by means of an assembly constituted by a U-shaped part, 101, three screws, 102 to 104, which pass through the U-shaped part, and by two leaf springs, 105, 106.

The prism 10 is cemented in place between the two parallel arms of the U-shaped part.

The three screws, 102 to 104, are parallel to one another and arranged in a triangle. They are screwed into the U-shaped part, 101, and their points bear against an edge, 110, of the opening 100; one part of the disc 3 and of the U-shaped part has been removed to show how the screw 103 comes into contact with the edge 110.

The two leaf springs, 105 and 106, are secured, by one of their ends, in two notches, 107, 108, respectively, said notches being provided in the edge of the opening 100. Spring 105 bears against the U-shaped part, 101, at a point that is located substantially between the screws 102 and 104, while spring 106 bears against the U-shaped part at a point that is located substantially between the screws 103 and 104. The U-shaped part, maintained in this way, enables the prism 10 to be orientated by acting on screws 102 to 104. This adjustment enables the image of the test pattern 8 to be perfectly centered on the camera tubes 11, 12 and 13 represented in FIG. 1. Here again, the camera lens 1 must be removed temporarily in order to make this adjustment.

It should be noted that, in order to prevent sliding diplacement of the points of screws 102, 103 and 104 over the edge 110, the surface of edge 110 has a tapering depression, not visible in FIG. 2, in which the point of screw 104 is placed, and a longitudinal groove, 109, in which the point of screw 103 is placed; the point of screw 102 bears against a plane portion of edge 110.

The present invention is not limited to the example described; the prisms 6 and 10 could thus, for example, be replaced by mirrors and prism 6 could be associated with a means enabling its orientation to be adjusted, this means possibly being similar to the one associated with prism 10. In the same way, the objective lens of the diascope could be constituted by several mechanically separate optical units, at least one of which could be adjusted in a similar way to that in which objective lens 9 is adjusted. Similarly, instead of the diascope having a slot 14 (FIG. 2) that is common to the slide holder and to the objective lens, it could have slots that are different for the slide holder and the objective lens or each of the separate optical units of an objective lens; in this case, it would be necessary for said different slots to be placed on a common optical path and, for this purpose, for example, for them to be aligned and for the wall between two consecutive slots to be pierced in order to allow through the light beam of the diascope.

Another alternative embodiment of the diascope of the invention could comprise an adjustable light condenser; for this purpose, the condenser could be mounted like the objective lens 9 (FIGS. 1 and 2) and adjusted in the same way.

In addition, it should be noted that the invention can be applied not only to colour television cameras but also to black and white television cameras.

Of course, the invention is not limited to the embodiment described and shown which was given solely by way of example.

What is claimed is:

1. Diascope for a television camera designed in such a way as to enable optical adjustments and comprising for this purpose:
   a support in which is provided a rectilinear slot having a cross-section which flares from the bottom to the top,
   a slide holder, an objective lens and deflecting means for deflecting light rays,
   first and second pressure-applying means integral with said support, for pressing said slide holder and said objective lens respectively into said rectilinear slot,
   connecting means for connecting said deflecting means and said support comprising: fixing means integral with said deflecting means; three adjustable spacing means for adjustably spacing said fixing means from said support; and third pressure-applying means, integral with said support, for pressing said deflecting means into contact with said support.

2. Diascope according to claim 1, wherein said slide holder comprises a cylindrical portion and is provided with n (n positive integer) pairs of parallel facets, designed to enable said slide holder to be angularly orientated by rotation about the axis of said cylindrical portion by using gripping means having two surfaces facing one another whose distance corresponds to the distance between the facets of said pairs.

3. Diascope according to claim 1, wherein said objective lens comprises a cylindrical portion and at least one bearing point designed to enable the position of said objective lens to be adjusted by applying to the bearing point a force tending to displace said objective lens along a rectilinear path inside said slot.

4. Diascope according to claim 1, or 2, or 3, wherein said first and second pressure-applying means comprise leaf springs having one end attached to said support and having another end bearing on said slide holder to exert a pressure tending to press said slide holder into said slot, in the case of said first pressure-applying means, and having another end bearing on said objective lens in order to exert a pressure tending to press said objective lens into said slot, in the case of said second pressure-applying means.

5. Diascope according to claim 1, wherein said three adjustable spacing means comprise respectively three screws having parallel longitudinal axes, said screws being arranged in a triangle and being screwed into said fixing means, through which they pass completely, wherein said three screws have points that rest on said support, and wherein said third pressure-applying means comprise m leaf springs (m positive integer) having one end attached to said support, said m leaf springs being designed to apply pressure to said fixing means.

* * * * *